(No Model.)

W. H. BROCK.
CHAIN WRENCH.

No. 366,451. Patented July 12, 1887.

WITNESSES:

INVENTOR:
W. H. Brock
BY Munn & Co.
ATTORNEYS.

UNITED STATES PATENT OFFICE.

WILLIAM H. BROCK, OF BROOKLYN, NEW YORK.

CHAIN WRENCH.

SPECIFICATION forming part of Letters Patent No. 366,451, dated July 12, 1887.

Application filed April 22, 1887. Serial No. 235,779. (No model.)

*To all whom it may concern:*

Be it known that I, WILLIAM H. BROCK, of Brooklyn, in the county of Kings and State of New York, have invented a new and useful Improvement in Chain Wrenches, of which the following is a full, clear, and exact description.

The present invention relates to the construction of the chain of chain wrenches and the form of yoke or dog used in connection therewith, as will be hereinafter fully described.

Reference is to be had to the accompanying drawings, forming a part of this specification, in which similar letters of reference indicate corresponding parts in all the figures.

Figure 1:
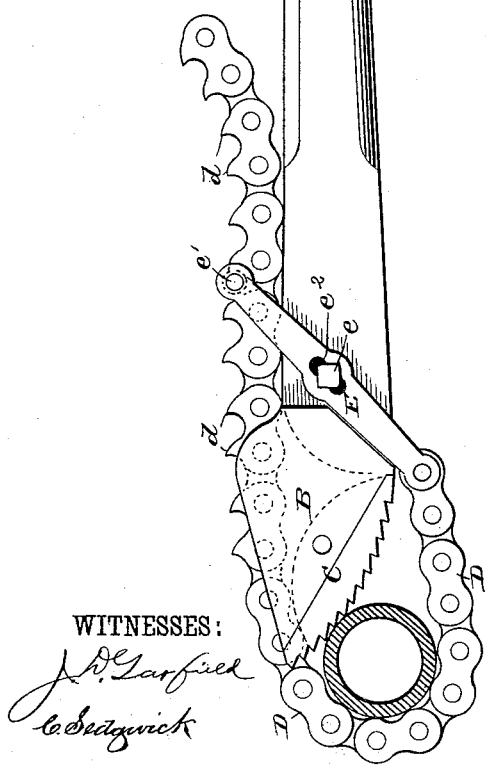
Figure 2:
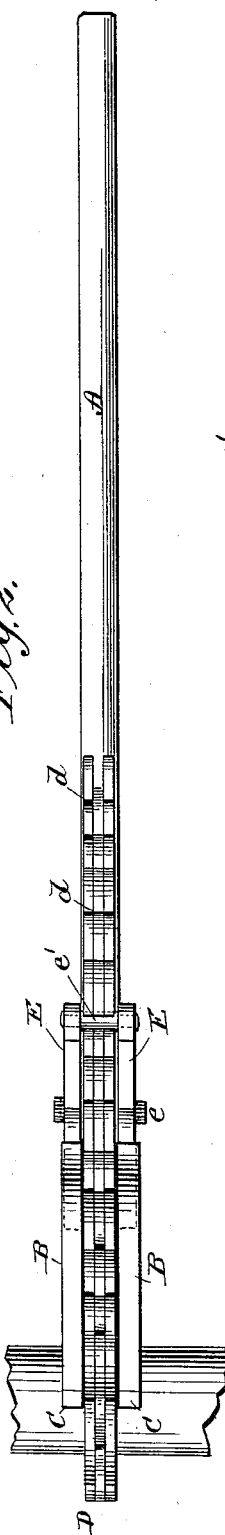
Figure 3:
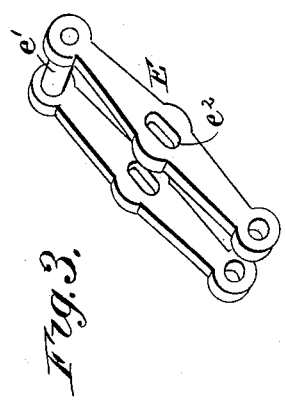

Figure 1 is a side elevation of a wrench embodying my invention. Fig. 2 is a plan view, and Fig. 3 is a perspective view of the yoke or dog detached.

The handle A of the wrench is formed with the head B, in front of which is secured a shoe or jaw, C, and a slot is formed in the top of the said head and jaw to receive the chain D. The chain D is secured at one end to the lower ends of the downwardly-projecting arms of a yoke or dog, E, that is pivoted at or near its center to the handle A by a pivot, $e$, one arm of said dog being on each side of said handle. The yoke or dog E is formed with oblong slots $e^2$ at the pivot-point, so as to have a slight sliding movement on pivot $e$.

The upwardly-projecting arms of dog E are connected by the cross-bar $e'$, which is forged or riveted to said arms, the upper portion of the dog thus spanning the top of the wrench.

The chain D is formed of flat links, preferably two and one alternately—that is, a single inner link and two oppositely-placed outer links; but, if desired, the succession of links may be two and two or two and four. Each of the links of the chain, or only those nearest the free end of the chain, are formed on one edge with buttons or spurs $d$, each member of each link being formed with two such spurs, which are so disposed as to incline forward when the free end of the chain is brought up under the cross-bar $e'$ of the dog E, and will be engaged by said dog. The spurs $d$ on the opposite members of the outer links register with each other, and will register with the rear spurs of the inner links when the chain is straightened out, the forward spurs on the inner links then registering with the rear spurs on the next forward outer links. By thus forming the spurs, the strain of the dog E thereon will be distributed over several spurs, and the likelihood of their breaking greatly reduced.

In operation the tendency of the chain will be to draw the dog E downward and positively engage the upper end or cross-bar thereof with the spurred end of the chain, and the oblong slots $e^2$ in the arms of the dog allow of this action and admit also of the dog being raised, to insert the spurred end of the chain beneath the said dog or to remove it therefrom.

The lower arms of the dog E may project at an angle, if desired, or be dispensed with entirely and the chain secured directly to the wrench.

I am aware that it is not broadly new to form chains with spurs on the edge, and I do not broadly claim the same. I am also aware that a pivoted dog for engaging a notched bar on the free end of the chain is not new in chain wrenches.

Having thus described my invention, what I claim as new, and desire to secure by Letters Patent, is—

1. The combination, in a chain wrench, of the chain formed with spurs and a pivoted dog for engagement with said spurs, substantially as shown and described.

2. The combination, in a wrench, of the chain D, formed of flat links, single and double links alternating, the links at the free end of the chain being formed with spurs $d$, the spurs on the forward ends of the outer links registering, when the chain is straightened, with the spurs on the rear ends of the inner links, and the spurs on the forward ends of the inner links registering with the spurs on the rear ends of the outer links, and a pivoted dog, E, for engaging said spurs, substantially as shown and described.

3. The combination, in a chain wrench and with a pivoted dog thereon, of a chain formed of flat links, single and double links alternating, the spurs of the inner and outer links registering, substantially as shown and described.

4. The combination, in a chain wrench, of a pivoted dog, E, a chain, D, secured at one end to the downwardly-projecting arms of the said dog, the links at the opposite end being formed with spurs $d$, for engagement with dog E, substantially as shown and described.

5. The combination, in a chain wrench, with a pivoted dog, E, having downwardly-projecting arms, of the chain D, secured at one end to said projecting arms and constructed with spurred links at the free end, and single and double links alternating, the spurs $d$ on the outer links registering with the spurs $d$ on the inner links, substantially as shown and described.

WILLIAM H. BROCK.

Witnesses:
C. SEDGWICK,
J. L. MCAULIFFE.